United States Patent [19]

Osanai

[11] 4,202,513
[45] May 13, 1980

[54] TAPE END DETECTOR FOR REEL DRIVEN CASSETTE TAPE RECORDER

[75] Inventor: Akira Osanai, Hachioji, Japan

[73] Assignee: Olympus Optical Co., Ltd., Japan

[21] Appl. No.: 912,083

[22] Filed: Jun. 2, 1978

[30] Foreign Application Priority Data

Jun. 8, 1977 [JP] Japan .................. 52-74334

[51] Int. Cl.² ...................... G11B 15/22; G11B 15/30
[52] U.S. Cl. ........................... 242/189; 242/57; 242/191; 242/201
[58] Field of Search ............... 242/189, 190, 186, 201, 242/67.4, 57; 360/96, 93, 90

[56] References Cited

U.S. PATENT DOCUMENTS

| | | | |
|---|---|---|---|
| 2,275,498 | 3/1942 | Berndt | 242/201 |
| 2,583,385 | 1/1952 | Miller | 242/67.3 R |
| 3,670,981 | 6/1972 | Cavella | 242/67.4 |
| 3,854,670 | 12/1974 | Bertolazzi | 242/67.4 |
| 3,887,943 | 6/1975 | Katsurayama | 242/189 |
| 3,973,473 | 8/1976 | Suzuki | 242/186 |
| 4,046,334 | 9/1977 | Kato et al. | 242/201 |

*Primary Examiner*—George F. Mautz
*Attorney, Agent, or Firm*—Lerner, David, Littenberg & Samuel

[57] ABSTRACT

A tape end detector for reel driven cassette tape recorders includes a drive gear which is driven by a motor, a transmission gear which normally transmits the rotation of the drive gear to a take-up gear associated with a tape take-up shaft but which revolves around the drive gear to detect a tape end being reached whenever the take-up gear ceases to rotate when a terminal end of a tape being taken up is reached, and a support arm for supporting the transmission gear and adapted to be driven angularly by the revolution of the transmission gear to achieve an auto-shutoff operation of the tape recorder.

6 Claims, 4 Drawing Figures

TAPE END DETECTOR FOR REEL DRIVEN CASSETTE TAPE RECORDER

BACKGROUND OF THE INVENTION

The invention relates to a tape end detector for reel driven cassette tape recorders of a small size, and more particularly to such detector which automatically detects when the terminal end of a tape being taken up is reached.

A cassette tape recorder of a small size which employs a cassette tape having its opposite ends secured to a pair of take-up and rewind hubs may be classified into two types of tape drive, namely, a capstan drive and a reel driven type. With the capstan drive type, the tape is transported by the cooperation between a capstan and a pinch roller, and this enables the tape to be positively fed at a uniform rate at the expense of a complex arrangement for the provision of the capstan and the pinch roller. With the reel driven type, the tape is transported by directly driving either hub, so that the construction can be simplified even though the tape transport speed may vary to a certain degree.

A tape cassette or the reel driven type is primarily used for a short duration of playing time because of the difficulty involved with feeding the tape at uniform rate, as exemplified owned by Mini Cassette Tape (registered trademark by Philips). Such cassette tape is used in a dictating machine and a cassette tape recorder of a miniature size. By contrast, a tape cassette of the capstan drive type is manufactured in two sizes including the compact cassette and the micro-cassette and has a playing time which ranges from a short period to a prolonged period. A variety of cassette tape recorders are also available for use with such variety of tape cassettes of the capstan drive type. Various improvements have been made in the cassette tape recorder of the capstan drive type and include the detection of a tape end being reached during a record/playback operation of the recorder. In one arrangement, the tape end is detected to stop the recorder operation automatically. In another arrangement referred to as an auto-shutoff apparatus, the operative condition of the recorder is released upon the tape end being reached, returning all of the operating members of the recorder to their respective inoperative positions in an automatic manner.

However, these capabilities are not available with a cassette tape recorder of a miniature size which utilizes a mini-cassette tape of reel driven type.

SUMMARY OF THE INVENTION

Therefore, it is an object of the invention to provide a tape end detector for reel driven cassette tape recorders of a miniature size which automatically detects the tape end being reached, by utilizing the cessation of rotation of a gear on the tape take-up shaft which causes a revolution of a transmission gear around a drive gear when the tape end being taken up is reached.

It is another object of the invention to provide an auto-shutoff apparatus which automatically releases a record/playback operating member and returns it to its inoperative position in response to an angular movement of a support arm carrying a transmission gear as the latter revolves.

In a tape recorder of the reel driven type, a transmission gear transmits the rotation of a drive gear to a tape take-up or rewind shaft. In accordance with the invention, the transmission gear is utilized to form a tape end detecting mechanism which is simple in construction and which can be manufactured inexpensively. The transmission gear is mounted on a support arm, the angular movement of which is utilized to return a record/playback operating member automatically, thus enabling an auto-shutoff apparatus to be constructed in a simple manner.

In the tape end detector of the invention, the support arm which carries the transmission gear also forms a tape rewind operating member, which avoids the need for a separate member in order to construct an auto-shutoff apparatus. When the rewind member is manually operated to rewind the tape, the record/playback operating member having a button associated therewith is automatically returned to its inoperative position, thus permitting a smooth mode switching.

DESCRIPTION OF PREFERRED EMBODIMENT

Figure 1:
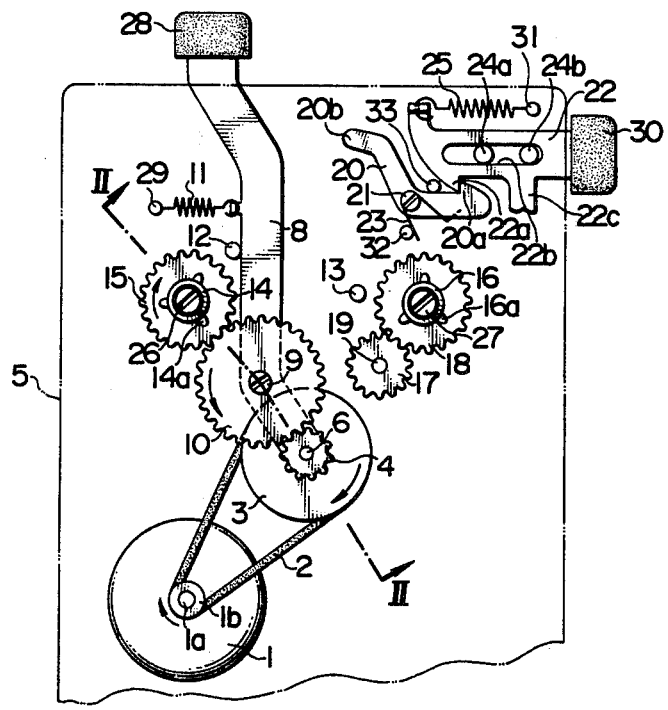
FIG. 1 is a plan view of a tape end detector and an auto-shutoff apparatus for a reel driven cassette tape recorder which are constructed in accordance with one embodiment of the invention.

Referring to FIG. 1, there is shown a drive motor 1 which is suitably mounted on a stationary baseplate 5 of a tape recorder. The motor has an output shaft 1a on which an output pulley 1b is fixedly mounted. An endless belt 2 extends around the pulley 1b and another pulley 3 which is fixedly mounted on a drive shaft 6, thus transmitting the rotation of the motor 1 to the drive shaft 6. As indicated by an arrow, the motor 1 is adapted to rotate clockwise, and hence the shaft 6 is also driven in the clockwise direction.

Figure 2:
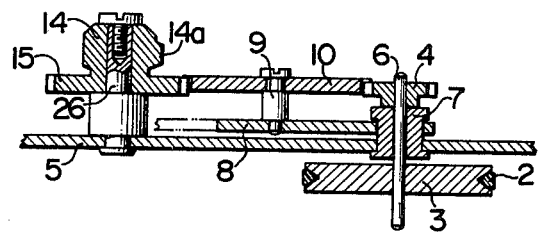
FIG. 2 is an enlarged cross section taken along the line II—II shown in FIG. 1.

Referring to FIG. 2, it will be seen that the drive shaft 6 is rotatably mounted in the baseplate 5 by means of bearing 7, with its lower end fixedly carrying the pulley 3. A drive gear 4 is fixedly mounted on the top portion of the drive shaft 6 which extends above the baseplate, and meshes with a transmission gear 10, which is adapted to transmit a rotating drive to a take-up gear 15 or a rewind gear 18. Gears 15, 18 are integrally mounted on hollow shafts 14, 16, respectively, and thus rotate these respective shafts when they are driven by the transmission gear 10.

The tape take-up shaft 14 is rotatably mounted on a mounting shaft 26 which is fixedly mounted on the baseplate 5. The tape rewind shaft 16 is rotatably mounted on a mounting shaft 17 which is fixedly mounted on the baseplate 5. As will be noted from FIG. 1, the mounting shafts 26, 27 are located on the baseplate 5 in a manner symmetrical with respect to the drive shaft 6. The center-to-center spacing between the shafts 14, 16 corresponds to that between tape hubs of a tape cassette, not shown, which is mounted thereon. Each of the shafts 14, 16 is integrally formed with outwardly extending projections 14a, 16a on their outer periphery, which engage between the corresponding projections extending inwardly from the tape hubs when the latter are fitted on the shafts 14, 16. In this manner, when either shaft 14 or 16 is driven for rotation, the associated hub rotates to run the tape from one of the tape hubs to the other.

The shaft 14 is driven for clockwise rotation as a result of a meshing engagement between the gear 15 and the transmission gear 10. The rewind shaft 16 is driven for counter-clockwise rotation as a result of a meshing engagement between the transmission gear 10 and an idler 17 which is normally maintained in meshing engagement with the gear 18. The idler 17 is rotatably mounted on a shaft 19 which is fixedly mounted on the baseplate 5.

The transmission gear 10 is rotatably mounted on a shaft 9 which is secured to a support arm 8 having its one end pivotally mounted around the bearing 7. The free end of the support arm 8 extends upwardly of the baseplate 5, as viewed in FIG. 1, with its extremity extending outside the tape recorder and carrying an operating button 28. The support arm 8 also serves as a tape rewind operating member, and can be turned clockwise about the shaft 6 when the button 28 is manually moved to the right, as viewed in FIG. 1. Thereupon, the transmission gear 10 is moved into engagement with the idler 19 to transmit the drive from the shaft 6 to the rewind gear 18, thus rotating the rewind shaft 16 counter-clockwise to rewind the tape (see FIG. 4).

However, the support arm 8 is normally biased in the counter-clockwise direction about the shaft 6, by a coiled tension spring 11 which extends between the arm and a pin 29 fixed to the baseplate 5. In this manner, the arm is normally maintained in abutment against a stop pin 12. In this rest position, the transmission gear 10 engaging the drive gear 4 is maintained in meshing engagement with the take-up gear 15. The extent of the angular movement of the support arm 8 is limited by the stop pin 12 and another stop pin 13 which is fixed to the baseplate 5 adjacent to the rewind gear 18.

A constraining member 20 is pivotally mounted on a pin 21 secured to the baseplate 5 at a position above the rewind gear 18, as viewed in FIG. 1. A record/-playback operating member 22 can be maintained in its operative position by the constraining member 20. The member 22 is formed with an elongated guide slot 22b in its horizontal portion, into which extend a pair of stationary pins 24a, 24b fixedly mounted on the baseplate 5, thus allowing a sliding movement of the member 22 relative to the baseplate 5 in the horizontal direction, as viewed in FIG. 1. A part of the operating member extends to the right, as viewed in FIG. 1, of the baseplate 5 and outside the tape recorder, with a record/-playback button 30 fixedly mounted on the free end thereof. When the button 30 is depressed, namely, moved in a direction onto the baseplate 5, a lateral arm 22c extending downwardly therefrom closes a main switch to establish a record or playback mode of the tape recorder.

A coiled return spring 25 extends between an upper edge of the operating member 22 and a pin 31 secured to the baseplate 5 for urging the member to the right, as viewed in FIG. 1 whenever it is released, thus automatically returning it to its inoperative position. The member 22 is maintained in its operative position by an engagement between a hook 22a formed thereon and the constraining member 20. The hook 22a is formed to project from the lower edge of the arcuate free end of the member 22 and is adapted to engage a corresponding hook 20a formed on the constraining member 20.

The constraining member 20 is generally L-shaped, with the hook 20a being formed on the free end of one arm which extends below the member 22. The constraining member 20 has another arm which extends in an upward, oblique direction, as viewed in FIG. 1, with its end portion 20a being bent to extend to the left so as to extend into the path of angular movement of the support arm 8. A torsion spring 23 is disposed on the pin 21 on which the constraining member 20 is mounted, and has its one end anchored to the arm adjacent to the hook and its other end anchored to a pin 32 secured to the baseplate, thus urging the constraining member 20 to rotate counter-clockwise about the pin 21. However, the resulting rotation is normally prevented by the abutment of the hook arm against a stop pin 33 fixedly mounted on the baseplate.

In operation, when the button 30 is depressed to establish a record or playback mode, the record/playback magnetic head is maintained in abutment against a running tape to perform a desired operation. Specifically, the depression of the button 30 causes the operating member 22 to move inward onto the baseplate 5 against the bias of spring 25 until the hook 22a engages the mating hook 20a on the constraining member 20, whereby it is maintained in its operative position. The movement of the operating member 22 also actuates a main switch, not shown, to energize the motor 1. Thereupon, the drive from the motor is transmitted through the belt 2, pulley 3, drive shaft 6, drive gear 4, transmission gear 10 to the take-up gear 15, rotating the tape take-up shaft 14 clockwise to cause a tape running. Hence, a desired record or playback operation can be achieved.

When the running tape reaches its terminal end, the shaft 14 ceases to rotate since the tape end is secured to the associated tape hub. Thereupon, the transmission gear 10 which has been rotating in the counter-clockwise direction to transmit the rotation of the drive gear 4 to the gear 15 will have its teeth riding up the teeth of the gear 15 when the gear 15 stops rotating, thus revolving or turning around the drive gear 4 in the clockwise direction. The revolution of the transmission gear occurs as a result of reaction of the gear 15, and interrupts the meshing engagement between the gears 15 and 10, which provides an automatic indication of the tape end being reached.

Figure 3:
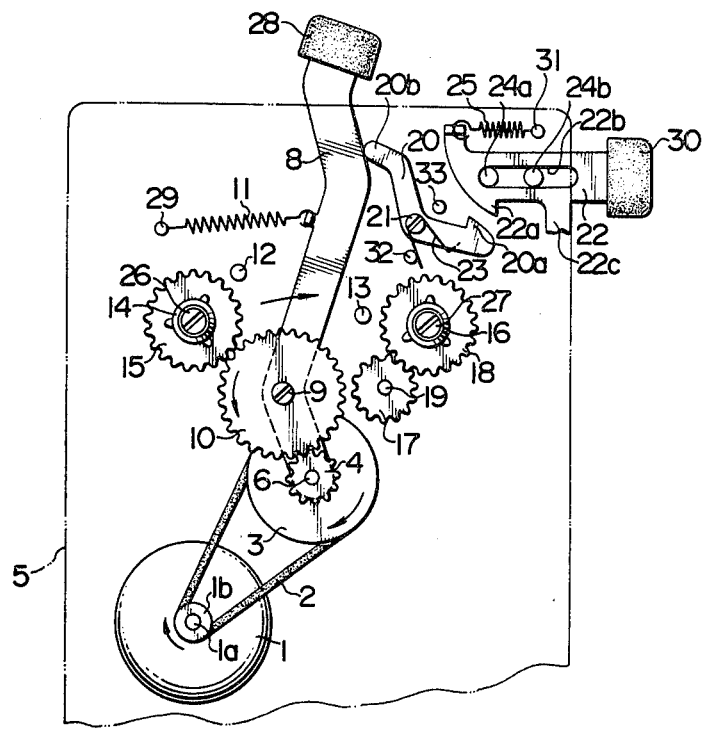
FIG. 3 is a plan view of the tape end detector and the auto-shutoff apparatus in their operative condition.

In addition, the revolution of the transmission gear 10 around the drive gear 4 causes an angular movement of the support arm 8 clockwise about the drive shaft 6 against the resilience of the spring 11. Thereupon, the free end portion of the arm 8 moves into abutment against the free end 20b of the constraining member 20 to drive it for clockwise rotation about the pin 21 against the resilience of the torsion spring 23, as shown in FIG. 3. Thereupon, the hook 20a is disengaged from its mating hook 22a to permit the operating member 22 to be returned to its inoperative position under the resilience of the spring 25. This opens the main switch, accomplishing the auto-shutoff of the tape recorder.

Figure 4:
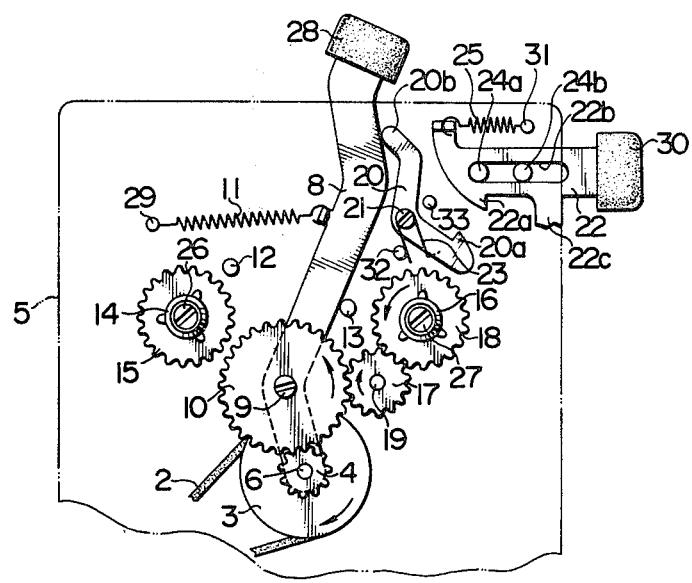
FIG. 4 is a plan view illustrating the tape rewind mode.

When a tape rewind is desired, the button 28 is manually moved to the right until the arm 8 bears against the stop pin 13, as shown in FIG. 4. The clockwise movement of the arm 8 moves the transmission gear 10 away from the take-up gear 15 and into meshing engagement with the idler 17, whereby the rotation of the drive shaft 6 is transmitted through the drive gear 4, transmission gear 10 and idler 17 to the rewind gear 18, rotating the rewind shaft 16 counter-clockwise. As a consequence, the tape on the tape hub associated with the take-up shaft 14 is reeled off therefrom to be taken up by the hub associated with the rewind shaft 16.

When the arm 8 is moved into abutment against the stop pin 13 against the resilience of the spring 11, its free end bears against the free end 20b, and the constraining member 20 is rocked clockwise about the pin 21 as shown in FIG. 4. As a result, if the tape recorder is in its record or playback mode, the disengagement of the hook 22a from the mating hook 20a automatically releases the operating member 22 from its operative position, allowing the member 22 to be returned to its inoperative position under the resilience of the spring 25.

Thus it will be seen that with the apparatus of the invention, the movement of the support arm 8 to a tape rewind position automatically releases a record or playback mode and permits a tape rewind in a smooth manner. This, it will be appreciated, is a substantial simplification of operation as compared with the prior art practice in which the record or playback mode must be released before the rewind button can be operated.

It is to be noted that though the main switch is opened when the operating member 22 is automatically returned, the motor continues to be energized through a switch, not shown, which is closed as the support arm 8 is moved to the tape rewind position shown in FIG. 4.

It will be noted from the foregoing description that in the apparatus of the invention, the support arm 8 which serves as a tape rewind member also serves as an operating member for manually stopping the tape recorder. Thus, when the tape recorder in its record or playback mode is to be manually stopped, it is only necessary to operate the button 28 to move the support arm 8 clockwise to the auto-shutoff position (see FIG. 3). The angular movement of the support arm causes the constraining member 20 to release the operating member 22 from its operative position and to allow it to return to its inoperative position automatically, thus stopping the operation of the tape recorder. As a consequence, a separate stop button need not be provided. While in the embodiment described above, the operating member 22 is maintained in its operative position or released from such position by the constraining member having the hook 20a, the constraining member may be replaced by a combination of a switch which is operated by the angular movement of the arm 8 and an electromagnet unit which is effective to maintain the operating member 22 in its operative position or to release it.

In addition, an end alarm may be provided which is responsive to a switch operated by the angular movement of the support arm 8 so as to provide an audible alarm when the terminal end of a running tape is reached.

What is claimed is:

1. A tape end detector for a reel driven cassette tape recorder, comprising a drive shaft mounted for rotation on a stationary baseplate a drive gear mounted on the drive shaft; a take-up gear mounted on a tape take-up shaft; a rewind gear connected to a drive tape rewind shaft; a support arm pivotally mounted for manual or driven movement between first, second, and third positions; a transmission gear rotatably mounted on the support arm so as to mesh with the drive gear and said take-up gear in said first position; the take-up gear rotating the tape take-up shaft in response to the transmission of a drive from the drive gear through said transmission gear; the transmission gear being arranged to revolve around the drive gear when the take-up gear stops rotation due to a tape end being reached and, in response to a drive from the drive gear, to cause said driven movement of the support arm to said second position to thereby provide an indication of the tape end being reached; a constraining member for maintaining a record/playback operating member in an operative position; said support arm in said second position directly engaging and actuating said constraining member to move said operating member to an inoperative position to shut off said tape recorder; said support arm in said second position being out of driving engagement with said take-up gear and said rewind gear; movement of said support arm to said third position causing said transmission gear to be moved into driving engagement with said rewind gear to rotate said tape rewind shaft, said support arm in said third position also operating to hold said constraining member in an inoperative position, and means for normally urging the support arm to said first position in which the transmission gear is in meshing engagement with the take-up gear.

2. A tape end detector according to claim 1, said rewind gear being in driving engagement with an idler gear to rotate said tape rewind shaft.

3. A tape end detector according to claim 1 in which said urging means comprises a spring, and further including a stop pin for limiting the angular movement of said support arm in said first position.

4. A tape end detector according to claim 1, said drive shaft being driven by a motor through an endless belt which extends around a pulley fixedly mounted on the drive shaft and another pulley mounted on the output shaft of the motor.

5. A tape end detector according to claim 1, further including switch means responsive to the movement of the support arm to provide an indication of the tape end being reached.

6. A tape end detector according to claim 1, further including motor means for driving said drive shaft; and
switch means for energizing said motor means when said operating member is in its operative position, said switch means being opened to de-energize said motor means when said operating member is moved to its inoperative position.

* * * * *

UNITED STATES PATENT AND TRADEMARK OFFICE
CERTIFICATE OF CORRECTION

PATENT NO. : 4,202,513
DATED : May 13, 1980
INVENTOR(S) : Akira Osanai

It is certified that error appears in the above—identified patent and that said Letters Patent is hereby corrected as shown below:

Column 1, line 24, change "or" to --of--.

Signed and Sealed this

Fifth Day of May 1981

[SEAL]

Attest:

RENE D. TEGTMEYER

Attesting Officer     Acting Commissioner of Patents and Trademarks